UNITED STATES PATENT OFFICE.

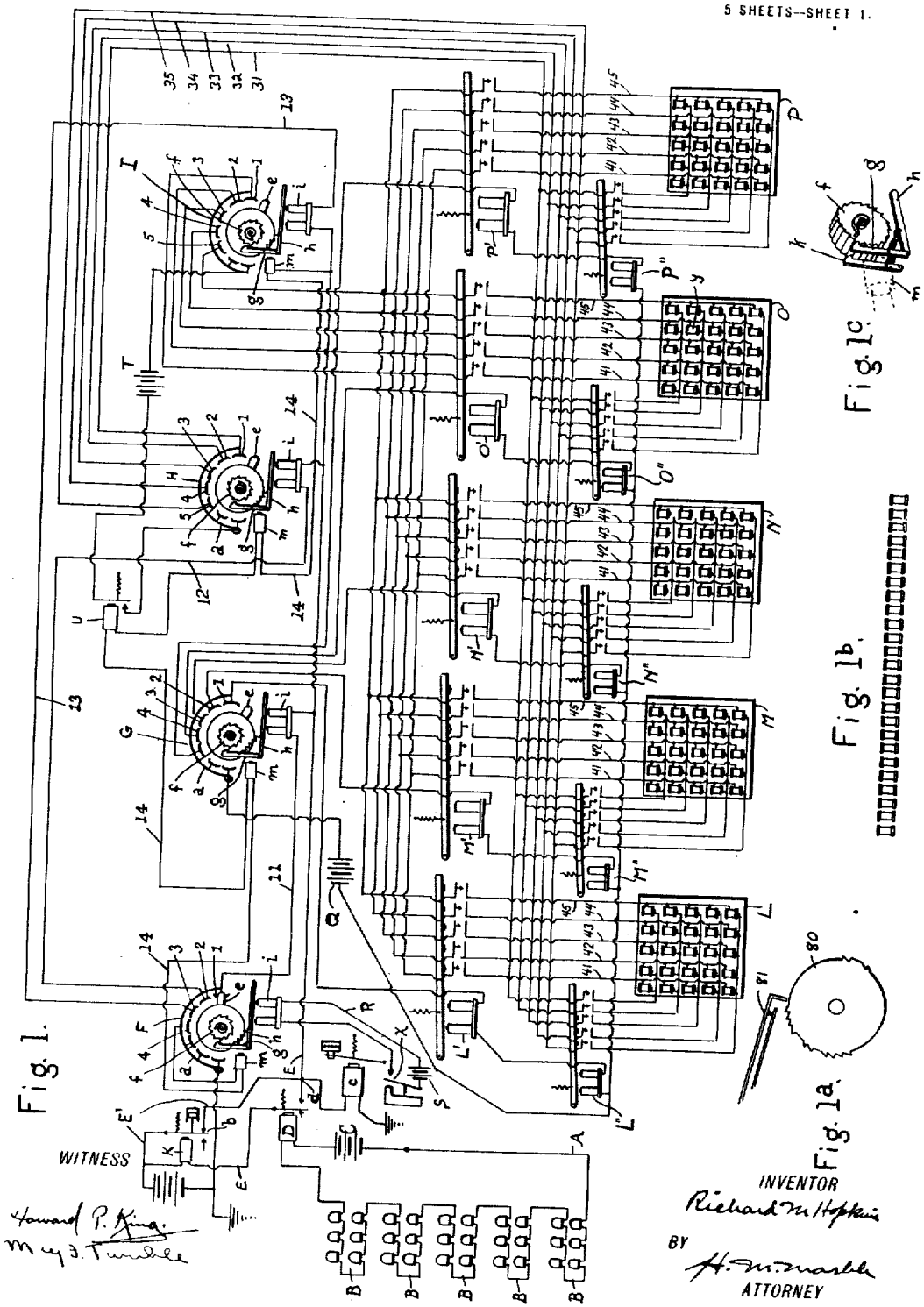

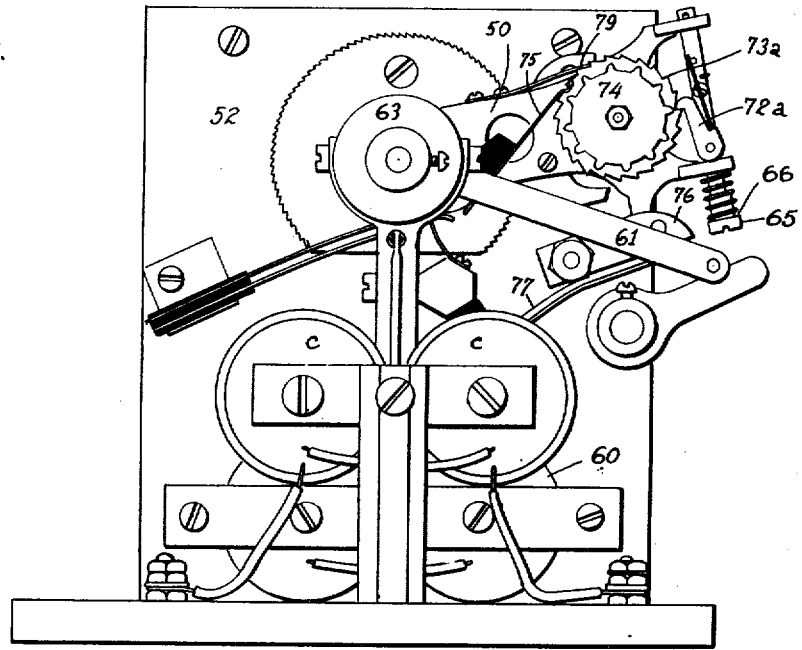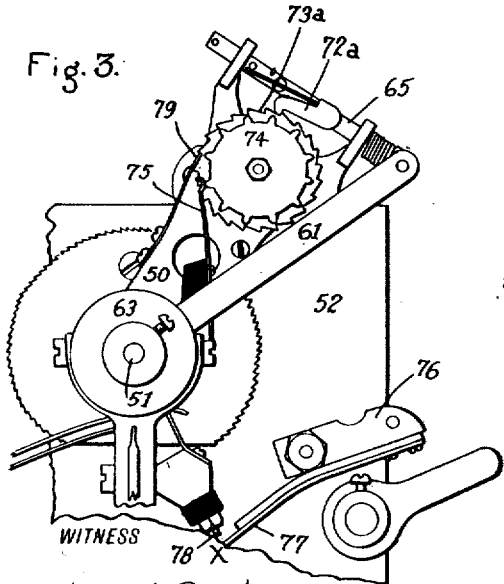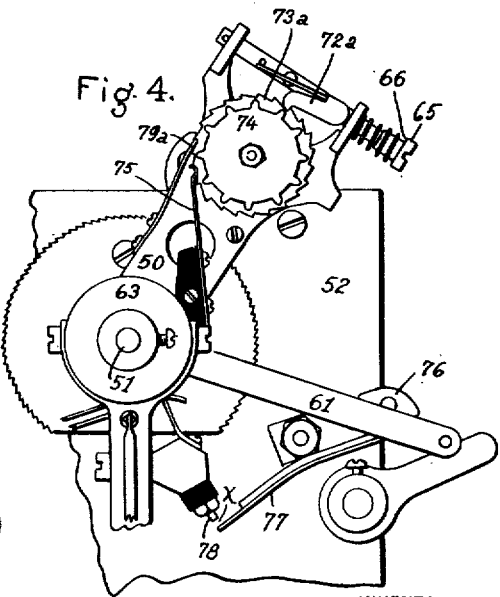

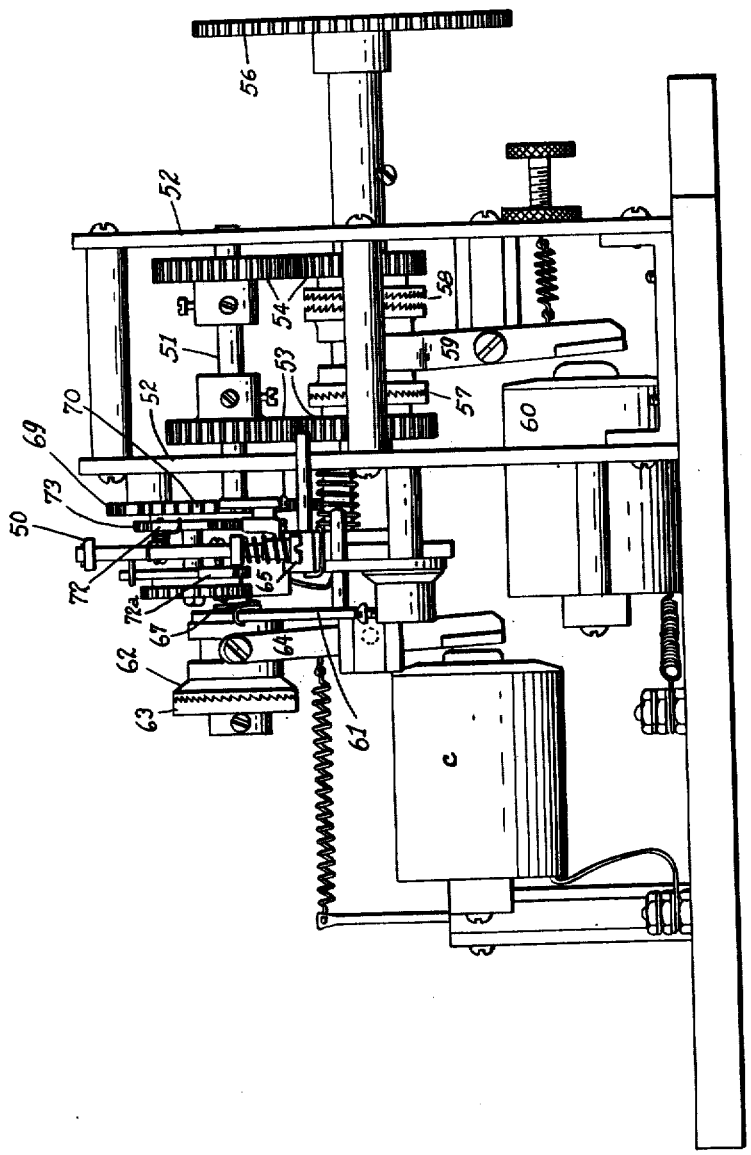

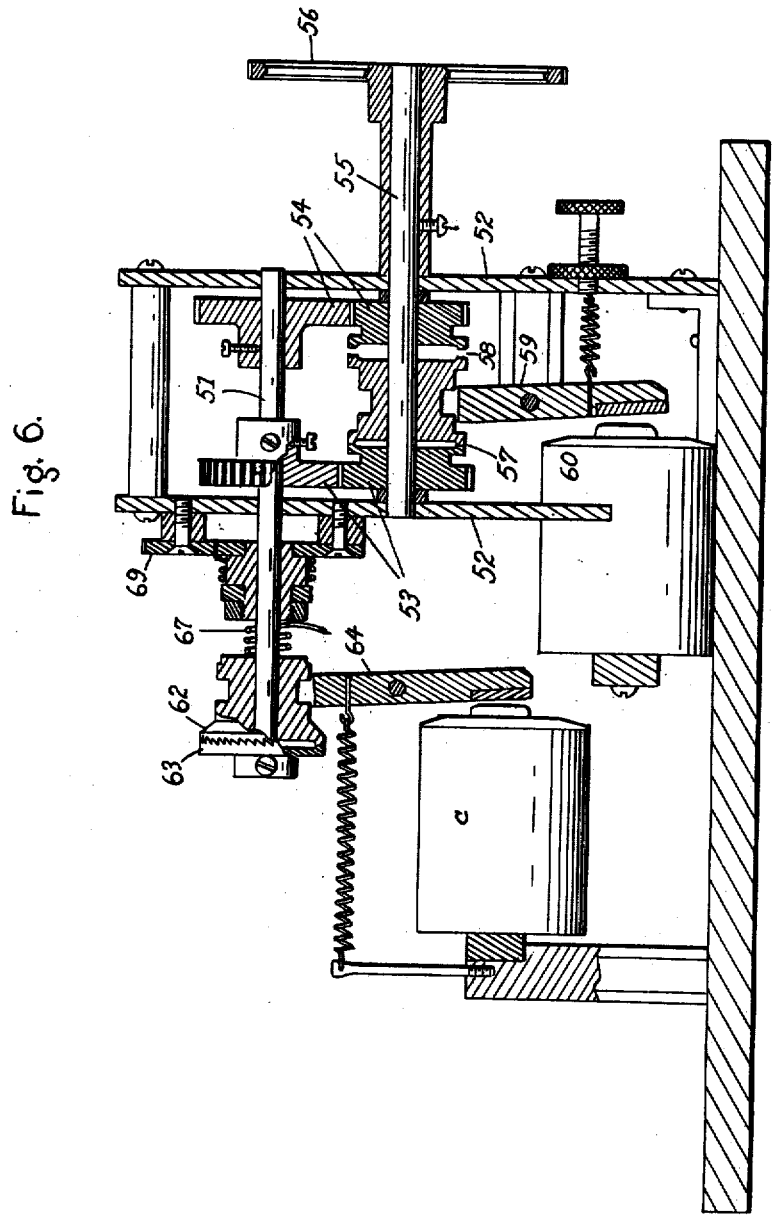

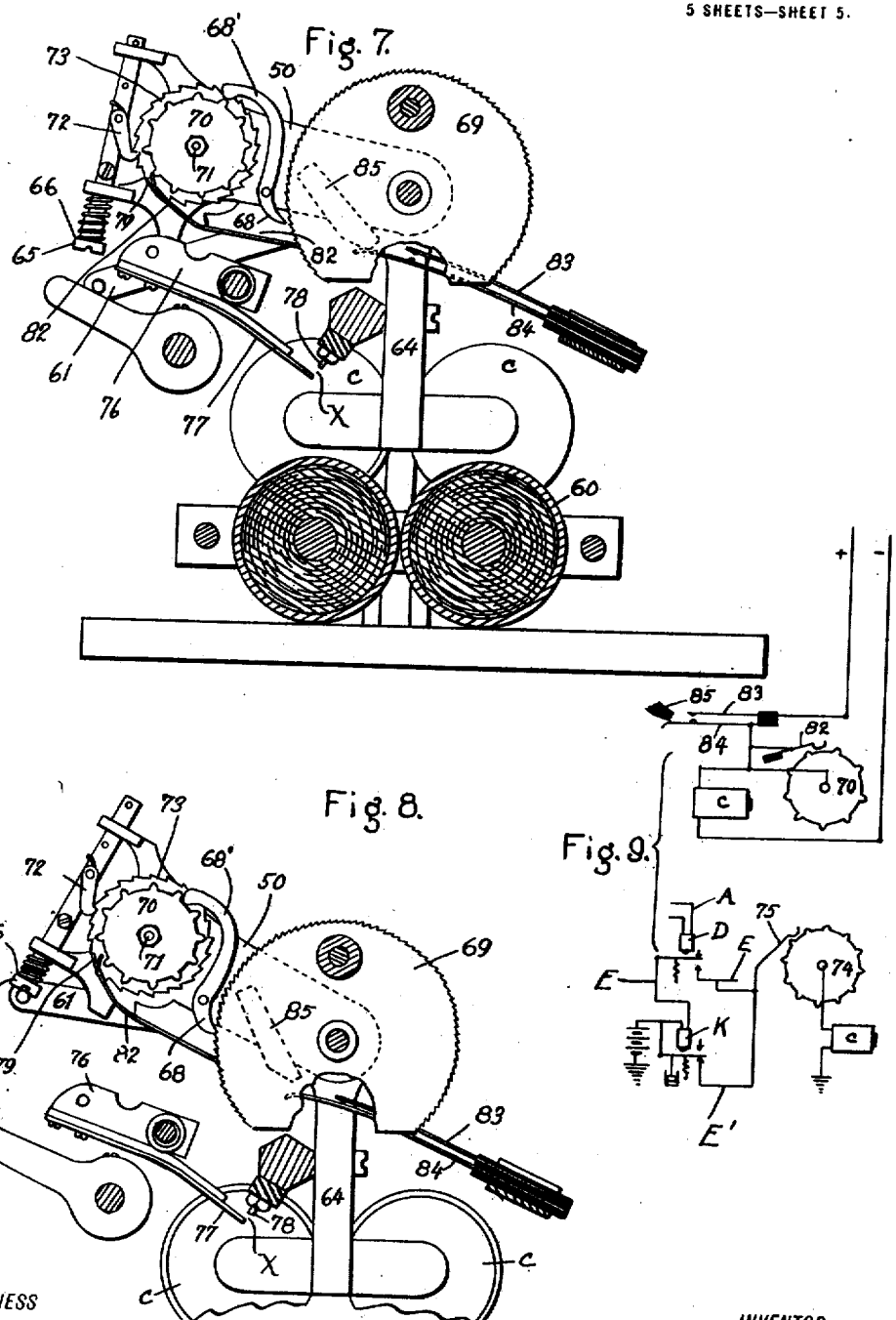

RICHARD M. HOPKINS, OF NEW YORK, N. Y., ASSIGNOR TO AMERICAN DISTRICT TELEGRAPH COMPANY, OF JERSEY CITY, NEW JERSEY, A CORPORATION OF NEW JERSEY.

RECORDING SYSTEM AND APPARATUS.

1,331,151.   Specification of Letters Patent.   Patented Feb. 17, 1920.

Application filed January 27, 1917. Serial No. 144,951.

*To all whom it may concern:*

Be it known that I, RICHARD M. HOPKINS, a citizen of the United States of America, and a resident of New York, in the county of New York and State of New York, have invented a certain new and useful Recording System and Apparatus, of which the following is a specification.

My invention relates to systems and apparatus for recording the signals of watchmen's signal boxes and the like. Heretofore it has been common to record the signals of a plurality of watchmen's signal boxes on a single circuit, without distinguishing, other than by the box number, between locations from which the signals come. In many cases it happens that the signal boxes of several subscribers or premises or buildings are located in the same circuit, and it is desirable to make the records for the different subscribers, or premises, or buildings, on different portions of a record sheet, or on different record sheets or dials. For example, it is desirable to be able to send, periodically, to each subscriber, the records of signals received from the boxes in his own premises, without, of course, sending to him the records from the boxes in the same circuit which are in the premises of other subscribers. In any case, it is obviously desirable to record the signals from the boxes of any one subscriber or premises, separately from the signals from the boxes of other subscribers or premises.

The present invention comprises means whereby this may be done; *i. e.*, a record of the signals from any one group of signal boxes of a circuit may be made which shall be entirely separate from the records of other groups of boxes of the same circuit. My invention consists in means whereby such separate groups of records may be made automatically; in means whereby derangement may not be caused because some signal boxes operate rapidly and others slowly; and in other features more fully described hereinafter and particularly pointed out in the appended claims.

Hereinafter, for convenience in description, it will be considered that each group of signal boxes pertains to a separate subscriber, and, correspondingly, that each group of signal-recording magnets, hereinafter referred to, pertains to a single subscriber. Obviously, in point of fact, one subscriber might have a plurality of groups of signal boxes; all of the signal boxes of all of the groups herein contemplated might be located on premises of the same subscriber; and the term "subscriber" is, in itself, a mere convenient reference term, without any necessary relation to the facts of any particular installation or installations. However, for convenient classification and recording of signals, it is desirable that the boxes of a circuit be divided into groups, and for the purpose of description it is convenient to consider that each group of boxes pertains to the premises of a single subscriber; and in actual practice this will usually be the case.

The objects of my invention are to distinguish, in the recording of signals transmitted through a circuit, between the signals of the boxes of different subscribers, and to group the records of signals from the boxes of each subscriber separately from the records of signals from the boxes of other subscribers, while employing a single line circuit only from the boxes of all of the said subscribers; to avoid derangement or disturbance or false signaling or false recording of signals due to different boxes having different speeds of operation; and, in general, to provide simple and reliable apparatus and circuits for the accomplishment of the above objects.

I will now proceed to describe with reference to the accompanying drawings apparatus and circuits constituting one embodiment of my invention, and will then point out the novel features in claims. In said drawings:

Figure 1 is a diagram illustrating a signal box circuit with a plurality of groups of signal boxes therein, and also illustrating diagrammatically the several selectors, relays, and record-making devices of the system.

Fig. 1ª shows diagrammatically an elevation of a contact wheel and pen such as may be employed in signal boxes such as illustrated diagrammatically in Fig. 1.

Fig. 1ᵇ is a diagrammatic view illustrating the rectilinear arrangement of the record-making magnets which is usually employed in practice, instead of the rectangular arrangement of those magnets illustrated in Fig. 1.

Fig. 1ᶜ is a fragmentary perspective view showing the two pawls of the ratchet mechanism of the selectors and showing the release magnet therefor.

Fig. 2 shows a side elevation of the space-controlled contact device or governor employed in connection with the system shown in Fig. 1.

Fig. 3 shows a fragmentary side elevation of said governor, with the main contact-operating arm 50 in process of being elevated.

Fig. 4 is a view similar to Fig. 3, showing said arm 50 in elevated position with the main operating arm in normal position.

Fig. 5 shows a side elevation of the said space-controlled contact device or governor.

Fig. 6 shows a central longitudinal section of that space-controlled contact device or governor.

Fig. 7 shows a transverse section of the said governor with the arm 50 in its normal depressed position and Fig. 8 is a similar view, showing said arm 50 in process of elevation, Figs. 7 and 8 being taken looking at the arm 50 from the right of Fig. 5.

Fig. 9 is a diagram illustrating the wiring of the space controlled contact device or governor.

Referring first to Fig. 1: A designates a signal box circuit, comprising five groups of signal boxes B, the number of boxes in each group being variable through wide limits. Each such box may be understood to comprise a signal-transmitting mechanism of the familiar toothed wheel and pen type, as shown, for example, in Fig. 1ᵃ; which mechanism, when operated, will break and complete the circuit A according to some prearranged signal, distinctive of the particular box to which the transmitting mechanism operated belongs. Such signal may be considered to be a box number, each number to consist of three "digits"; and one digit, preferably the initial digit, of the signals of the boxes of any one subscriber, i. e., the initial digit of all of the boxes of any one group, will be the same. In other words, the signals of all of the boxes of one group will begin with the digit "2"; the signals of all of the boxes of another group will begin with digit "3"; and so on. It should be explained, further, that the term "digit" is employed herein in a special sense. In the ordinary sense, the term "digit" includes any of the numerals from 1 to 9 inclusive. The break wheels of signal boxes comprise teeth, with intervening notches, arranged in three groups separated by spaces; and the number of teeth in any one of these three groups may exceed nine; yet it is convenient to speak of the number represented by the teeth of any one such group as a "digit", and no departure from principle is involved in so doing. However, in practice, it is rare that any one such group of teeth exceeds nine in number.

C designates a battery or other source of current supply, in circuit A, and D designates a main line relay, in said circuit A, which repeats the signals of boxes B into a circuit E connected to the frame a of a master selector F, to be referred to presently. There are three other similar selectors, G, H and I, also to be referred to presently. Circuit E also contains the magnet of a slow-acting or "time" relay K; and a branch circuit E' from circuit E passes through the armature and rear contact b of time relay K, and through the "clutch" magnet c of a mechanical governor, referred to hereinafter, to ground. Between contact b of relay K, and the clutch magnet c, there is a connection d to circuit E. The contacts of main line relay D, by which signals of the box circuit A are repeated into circuit E, are located between this connection d and the point from which branch E' departs from circuit E.

Each selector, F, G, H and I, comprises a frame or sector, a, provided with contact segments, numbered 1, 2, 3 etc.; a contact arm or brush, e adapted to travel over such segments; a spring-returned ratchet wheel f, connected to such brush arm e; and a ratchet-pawl g, for rotating such ratchet wheel f step-by-step, operated by the armature h of a ratchet-magnet i; and a holding pawl k (see Fig. 1ᶜ) is also provided for each ratchet wheel, together with a release magnet m which, when energized, retracts both ratchet-pawl g and holding-pawl k, so permitting contact arm e to return to normal.

L, M, N, O and P designate groups of record-making magnets, each such group corresponding to one of the groups of signal-boxes B, in circuit A, each magnet of each such group corresponding to one of the signal-boxes of the corresponding group. In other words, each magnet-group L, M, etc., corresponds to a particular subscriber, and each magnet of one such group corresponds to a particular signal-box of that subscriber. In practice, each such magnet operates a punch or other mark-making device, adapted to make a mark in or on a record-sheet or record-dial propelled by a clock-movement or other suitable time device. In Fig. 1, for convenience in tracing the circuits I have arranged the said record-making magnets of each such group L, M, etc., in rectangular fashion; but in practice they are usually arranged in a row, and when the record-sheet is a rotary dial, such row is usually radial with reference to the dial, as well known by those acquainted with watchmen's clocks, and as shown in Fig. 1ᵇ.

I have not thought it necessary to illustrate such a clock, as they are well known; nor have I thought it necessary to illustrate the punching mechanism operated by each of such record-making magnets, as the punching mechanism is well known.

For the selection of any particular record-making magnet, the group (L, M, etc.) to which that magnet pertains must first be selected; which is done by selector G, which, when it operates, selects two particular multi-contact relays L′, M′, etc., and L″, M″, etc., corresponding to the group (L, M, etc.) to which the record-making magnet to be selected belongs, and energizes the magnets of such relays. Selector H then selects a particular "outgoing" circuit conductor to which the particular record-making magnet to be selected is connected; and selector I then selects a particular "return" conductor to which the particular record-making magnet to be selected is connected. In the rectangular arrangement of the record-making magnets in groups, employed for convenience of illustration in Fig. 1, the "outgoing" conductors are the conductors 31—35 each passing through a contact of the relays L″, M″, etc., and then connected to a horizontal row of magnets of each of groups L, M, N, O and P; and the "return" conductors are the vertical conductors 41—45, each passing through a contact of one of the relays L′, M′, N′, O′ and P′, and thence connected to each magnet of a vertical row of groups L, or M, or N, or O, or P, as the case may be. The terms "outgoing" and "return" are purely optional and either the conductors 31—35 or the conductors 41—45 may be considered to be the outgoing conductors, the others being considered the return conductors; but for convenience in description, it has been considered desirable to term the conductors 31—35 the outgoing conductors, and to consider the conductors 41—45 the return conductors.

Neglecting for the present the action of the "time" relay K, and the mechanical governor illustrated in Figs. 2–9 inclusive (of which governor the "clutch" magnet $c$ forms a part) the operation of the system is as follows:—

Supposing one of the signal boxes B in circuit A to be operated, the signal transmitted by that box in circuit A is repeated by main line relay D into circuit E, which is connected to the ratchet-magnets $i$ of the selectors G, H, I; the return conductors 11, 12 and 13 of these magnets being connected to segments 1, 2 and 3, respectively, of selector F; and since the contact arm $e$ of selector F is normally on the segment 1 of that selector, magnet $i$ of selector G is operated by the first digit of the box-signal, advancing the contact arm $e$ of selector G over a number of segments of that selector corresponding to the numerical value of the first digit of the box signal. Supposing that first digit to be 4, the arm $e$ of the selector G will be advanced, during the transmission of that first digit, to segment 4 of selector G, closing circuit from battery Q through the magnets of relays O′ and O″; whereupon the armatures of those relays are attracted, and all of the contacts actuated by those armatures are closed; thereby confining subsequent operations of the selectors to one series of record-making magnets. The mechanical governor, illustrated in Figs. 2–9 inclusive, has a contact, designated by character X in Fig. 1, of which contact it is sufficient to say at present that it is closed by the governor upon the occurrence of the long space between digits of each box signal, but it is not closed during the short spaces between impulses of each digit. This contact X is in a local circuit R including a battery or other source of current supply S and the magnet $i$ of selector F. Upon the conclusion of the transmission of the first digit of the box signal, therefore, circuit R is closed through magnet $i$ of selector F, and the contact arm $e$ of that selector is moved to segment 2 of that selector, so switching circuit E from the magnet $i$ of selector G to the magnet $i$ of selector H.

During the transmission of the second digit of the box signal, magnet $i$ of selector H operates and advances the arm $e$ of that selector over a number of segments of that selector corresponding to the numerical value of that second digit. Supposing that second digit to be 2, the arm $e$ of selector H will be advanced, during the transmission of that second digit, to segment 2 of selector H, closing a partial-circuit path from battery or other source of current supply T and conductor 32 and the contact of relay O″ through which 32 passes, to the second horizontal row of record-making magnets of group O. The circuit through any one particular magnet connected to that conductor 32 is not completed, however, as the operation of selector I and relay U is required for the completion of circuit.

During the long space following the transmission of the second digit of the box signal, contact X of the mechanical governor is again closed, advancing the contact arm $e$ of selector F to segment 3 of that selector, and so switching the circuit E to the magnet $i$ of selector I.

During the transmission of the third digit of the box signal magnet $i$ of selector I operates and advances the arm $e$ of that selector over a number of segments of that selector corresponding to the numerical value of that digit. Supposing that third digit to be 4, the arm $e$ of selector I will be advanced, during the transmission of that third digit, to segment 4 of selector I, closing a partial circuit path from battery or other source of current supply T through conductor 44 of the vertical series 41—45 and through the corresponding contact of relay O' to the corresponding magnet of series O, and completing circuit through that magnet, except for the contact of a relay U, hereinafter mentioned; for conductors 32 and 44 together form a circuit path from battery T through a particular magnet of series O (which magnet is designated by character *y* in Fig. 1) and through battery T.

During the long space following the third and last digit of the box signal, contact X of the automatic governor is closed, so moving the contact arm *e* of selector F to the fourth segment of that selector, and so closing circuit from conductor E through conductor 14 and the release magnets *m* of the several selectors F, G, H, and I, so disengaging pawls *g* and *h* of the selectors and permitting the restoring springs of the ratchet wheels *f* to restore arms *e* to normal.

In the circuit of the restoring magnets *m* there is the magnet of a rapidly-operating relay U, controlling the circuit from battery T through the particular record-making magnet *y* which has been selected, as above described. When the restoring circuit is completed as just above described, this relay U, operating more rapidly than the magnets *m*, closes the circuit of battery T through the selected magnet *y* before the contact arms *e* of the selectors have started to return, so energizing that magnet *y* and causing a record to be made.

*Mechanical governor.*—Different signal boxes operate at different speeds, and it may even happen that the space between digits of one box may be longer than the space between impulses of a digit of another box in the same circuit. To obviate trouble from this source, the mechanical governor illustrated in Figs. 2-9 is provided. This governor comprises a swinging contact arm 50, adapted to be raised by a suitable motor-driven mechanism during the space between the first and second impulses of the first or succeeding digits of the signals of any of the boxes B, together with means for holding that arm in such elevated position until the occurrence of the next succeeding long space between digits of the box signal, at which time said arm 50 descends, and closes the contact X previously mentioned. Means are provided, as described presently, whereby this contact arm 50 is carried higher, during the space between the first and second impulses of any digit of a box signal, than it will be carried during any subsequent space between impulses of that digit; for while the spaces between impulses or closures in circuit E are quite regular in duration, yet there is apt to be some variation in length of such spaces between closures, and it is important, as will be understood from what has been said above, that contact X shall not be closed until the occurrence of the first space between digits. Since the arm 50 is carried higher during the first space between impulses than it can be carried during subsequent spaces between impulses of a digit, that arm will not be tripped and caused to descend and close contact X until the occurrence of the next succeeding long space—*i. e.*, a space between digits of the box signal.

Arm 50 is mounted loosely upon a shaft 51, itself mounted in suitable bearings in a frame 52. This shaft 51 is arranged to be driven, alternatively, through two gear trains 53 and 54, of different speed ratios, from a driving shaft 55 (itself driven by any suitable means, represented diagrammatically in the drawings by the spur-gear 56); clutches 57 and 58, operated by the armature-lever 59 of the magnet 60, determining whether shaft 51 shall be driven through the high-speed gear train 53 or through the low-speed gear train 54. Normally, (*i. e.*, when no signal is being transmitted from any of the signal boxes,) shaft 51 is being driven through the high speed gear train 53, but arm 50 is not being raised; for this arm is raised, during the sending of a box signal, by a second arm 61, secured to the driven member 62 of a further clutch 62—63 on shaft 51, said clutch being controlled by the armature lever 64 of the clutch-magnet *c*, previously mentioned with respect to Fig. 1; and this clutch-magnet *c* is energized normally, so holding the clutch 62—63 open.

When, during the first space between impulses (in circuit E) of the first digit of a box signal, clutch magnet *c* is deënergized (as described hereinafter), clutch 62—63 is closed, the arm 61, hereinafter referred to as the "operating arm", is raised, and engages the lower end of a spring-returned plunger 65 carried by arm 50, raising said plunger until the shoulder 66 thereon engages the arm 50 and raises said arm until such motion is arrested by the opening of the clutch 62—63, at the conclusion of the first space between impulses of the box signal. The operating arm 61 then falls, under the influence of gravity reinforced by a spring 67, but arm 50 remains in elevated position, being retained there by engagement of a pivoted pawl 68 (see Figs. 7 and 8), carried by arm 50, with a stationary ratchet-wheel 69 carried by the frame 52. This pawl 68 has a tail 68' adapted to engage alternatively the teeth and intervening notches of a cam-wheel 70 mounted on a shaft 71 itself mounted in a bearing in arm 50; and during the first lifting of plunger 65 incident to the first rise of operating arm 61, a spring-actuated pawl 72 (Figs. 7 and 8) carried by that plunger engages a tooth of ratchet wheel 73 on said shaft 71, moving cam-wheel 70 so that a notch of that cam-wheel is presented to the tail 68' of pawl 68, so permitting that pawl 68 to remain in engagement with stationary ratchet-wheel 69, and holding arm 50 in elevated position. When the operating arm 61 falls after its first rise, thus permitting plunger 65 to descend somewhat with reference to arm 50, a spring actuated pawl 72ª (see Figs. 2, 3 and 4) engages a tooth of ratchet wheel 73ª on shaft 71, so moving a contact wheel 74 connected to ratchet wheel 73ª so that one of the teeth of that contact wheel engages brush 75, thereby closing circuit through the gear-shift magnet 60, which magnet, being energized, operates clutches 57 and 58 so as to throw the high-speed gear train 53 out of action and to throw the low-speed gear train 54 into action.

During subsequent spaces between impulses of the first digit of the box signal, since shaft 51 is driven through the low-speed gear train, the operating arm 61 is not raised high enough to engage the plunger 65, even though such subsequent spaces be considerably longer than the space between the first and second impulses of the first digit. Consequently, contact 74—75 remains closed, arm 50 remains elevated, and the arm 61 rises and falls without performing any function. But upon the occurrence of the long space between the first and second digits of the box signal, (such space is usually at least twice as long as the spaces between impulses of a digit), operating arm 61 rises sufficiently high to raise plunger 65 as before, its pawl 72 moves the ratchet wheel 73 another step, and thereby cam-wheel 70 is moved so as to present a tooth under the tail 68' of pawl 68, so disengaging pawl 68 from stationary ratchet-wheel 69 and permitting arm 50 to descend during the descent of arm 61; and during such descent of arm 61, contact wheel 74 is advanced, so as to break contact with brush 75, so breaking the circuit of the gear-shift magnet 60, whereupon the high-speed gear train is thrown into action again, in readiness for the second digit.

When arm 50 has nearly reached the limit of its downward motion, it encounters a spring-actuated arm 76, and is thereby cushioned in its descent; and by the consequent motion of arm 76, a brush 77 carried thereby is brought into contact with contact point 78; these members 77 and 78 constituting the governor contact X of Fig. 1. The contact between 77 and 78 continues for an instant only, as arm 76 immediately rebounds, separating 77 and 78.

79 is a holding pawl for ratchet wheel 73, and 79ª is a corresponding holding pawl for ratchet wheel 73ª.

Returning for a moment to Fig. 1, and also referring to Fig. 1ª, which shows the break wheel 80 and pen or contact brush 81 of a typical signal box: The circuit A is normally closed, and is opened as the brush 81 rides up on each tooth of the wheel 80 during the rotation of that wheel. Normally, therefore, the contacts of main line relay D are open, but the circuit E' of clutch magnet $c$ is closed, through contact $b$ of slow-acting relay K, clutch 62—63 of the governor being thereby held open by magnet $c$. (In Fig. 1, for a diagrammatic indication of the slow-acting character of relay K, I have indicated the armature of said relay as provided with a piston working in a dash-pot; in practice, the magnet of said relay has a short-circuited core, $i.\ e.$, a core surrounded by a sheath of high-conductivity metal, the eddy currents induced in which sheath upon the magnetization or demagnetization of the core serving to make the relay slow-acting. Such magnets are well known). When, in the operation of one of the signal boxes B, the first tooth of the wheel 80 encounters the pen 81, circuit A is broken, and the armature of main line relay D drops back, closing the contact of that relay, and energizing the magnet of slow-acting relay K, whereupon contact $b$ of that relay is broken, clutch magnet $c$ being nevertheless held energized by current through the contact of relay D. When the first tooth of break wheel 80 leaves the pen 81, circuit A is closed, the armature of relay D is attracted and its contact broken, and since by this time relay K has operated to break its contact $b$, the circuit through clutch magnet $c$ is broken and clutch 62—63 is closed, so causing operating arm 61 to rise and raise arm 50. At the end of the first space between impulses of the box signal, circuit is again established through magnet $c$, and the clutch 62—63 opened.

Since circuit A is a normally closed circuit, while circuit E is a normally open circuit, interruptions in circuit A produce impulses or closures in circuit E. The signals in circuit A are, of course, the converse of the signals in circuit E. In speaking herein of impulses and spaces of the box signals, I mean those signals as transmitted through circuit E.

Since, during the rise of operating arm 61, incident to a long space, (such as a space between digits, or a space following the last digit) the arm 61 might well be carried far beyond the position occupied at the top of its movement incident to the first space between impulses of the preceding digit, and since such further movement of the arm 61, if unrestricted, might tend to carry arm 50 beyond the extreme range of movement intended for that arm, a brush 82 (see Figs. 7 and 8) is provided, which brush is arranged to make contact with a tooth of cam wheel 70, when plunger 65 is raised by operating arm 61 during a long-space period; that is to say, when plunger 65 is raised to trip arm 50 and permit descent thereof. This brush 82, when it so makes contact with a tooth of cam wheel 70, completes the circuit of clutch magnet c so opening clutch 62—63, and permitting descent of arms 61 and 50 without rise of that arm 61 through an angular distance corresponding to the full length of the corresponding space period of the signal. This contact 82—70 is therefore in the nature of a safety contact.

Two spring brushes, 83 and 84, are provided in the circuit of the gear shaft magnet 60; and the lower of these springs 84, is held away from spring 83 by a lug 85, carried by arm 50, when that arm is in its lowermost or normal position. These contacts 83 and 84, are in series with contacts 82 and 70, of the gear shift magnet 60, and when, after the opening of clutch 62—63, arm 50 descends as above described, contact is broken between 83 and 84 by action of lug 85 carried by arm 50, thereby deënergizing magnet c, and permitting clutch 62—63 to close; and, when, upon the next rise of arm 50, the contact wheel 70 is advanced by action of plunger 65, pawl 72, and ratchet wheel 73, thus breaking contact between brush 82 and a tooth of that wheel 70, contact between 83 and 84 is again closed, owing to rise of arm 50, thus permitting subsequent energization of magnet c, upon next descent of operating arm 61, to permit opening of clutch 62—63.

During transmission of the second and third digits of the box signal, the governor acts, as in transmission of the first digit, closing contact X during the spaces between the second and third digits and at end of the third digit.

Each group or series of record-making magnets L, M, N, O, and P, in connection with the circuits, whereby any particular magnet of such series may be selected, is to be regarded as constituting position-determining means, i. e., means for determining the position on the record sheet or dial, at which the record shall be made. In a companion application, Serial No. 144,952, filed January 27, 1917, I have illustrated and described means whereby, instead of providing a separate recording magnet for each box of each subscriber, one recording magnet only is provided for each subscriber, and other position-determining means are provided for determining the position on the record sheet or dial at which the record mark shall be made in accordance with the signal of the particular box operated.

In my said companion application Serial No. 144,952, filed January 27, 1917, I have claimed those features which are common to that case and to this, and therefore have claimed herein only those features which are not also contained in the disclosure of my said companion application.

What I claim is:—

1. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, of selecting means for determining the group to which a particular recording device to be selected belongs, selecting means for determining the two partial-circuit paths in which the recording device to be selected is included, and a master selector arranged to cause the operation of said selecting means under control of line signals.

2. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, of selecting means for determining the group to which a particular recording device to be selected belongs, selecting means for determining the two partial-circuit paths in which the recording device to be selected is included, and a master selector arranged to cause the sequential operation of said selecting means under control of multi-digit line signals.

3. In a recording system, the combination with a plurality of recording devices and a plurality of outgoing and return circuits therefor, each outgoing circuit including a plurality of recording devices and each return circuit including a plurality of recording devices, said outgoing and return circuits so arranged that selection of a particular recording device may be made by selecting the particular outgoing circuit and the particular return circuit in which that recording device only is jointly included, and selectors for so selecting said outgoing and return circuits.

4. In a recording system, the combination with a plurality of recording devices and a plurality of outgoing and return circuits therefor, each outgoing circuit including a plurality of recording devices and each return circuit including a plurality of recording devices, said outgoing and return circuits so arranged that selection of a particular recording device may be made by selecting the particular outgoing circuit and the particular return circuit in which that recording device only is jointly included, selectors for so selecting said outgoing and return circuits, and means for operating said selectors under control of signals.

5. In a recording system, the combination with a plurality of recording devices and a plurality of outgoing and return circuits therefor, each outgoing circuit including a plurality of recording devices and each return circuit including a plurality of recording devices, said outgoing and return circuits so arranged that selection of a particular recording device may be made by selecting the particular outgoing circuit and the particular return circuit in which that recording device only is jointly included, selectors for so selecting said outgoing and return circuits, and a master selector arranged to be operated by multiple-digit signals, and arranged to control such other selectors sequentially under control of successive signal digits.

6. In a recording system, the combination with a plurality of recording devices and a plurality of outgoing and return circuits therefor, each outgoing circuit including a plurality of recording devices and each return circuit including a plurality of recording devices, said outgoing and return circuits so arranged that selection of a particular recording device may be made by selecting the particular outgoing circuit and the particular return circuit in which that recording device only is jointly included, selectors for so selecting said outgoing and return circuits, a master selector arranged to be operated by multiple-digit signals, and arranged to control such other selectors sequentially under control of successive signal digits, and means, arranged to be operated by spaces between digits, but not to be operated by shorter spaces between digit-impulses, for operating said master-selector.

7. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, of selecting means for determining the group to which a particular recording device to be selected belongs, selecting means for determining the two partial-circuit paths in which the recording device to be selected is included, a master selector arranged to cause the operation of said selecting means under control of line signals, and means adapted to be operated by spaces between digits of line signals, but not to be operated by shorter spaces, for operating said master selector.

8. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, of selecting means for determining the group to which a particular recording device to be selected belongs, selecting means for determining the two partial-circuit paths in which the recording device to be selected is included, a master selector arranged to cause the operation of said selecting means under control of line signals, and means for returning such selectors to normal upon conclusion of transmission of the signal.

9. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, of selecting means for determining the group to which a particular recording device to be selected belongs, selecting means for determining the two partial-circuit paths in which the recording device to be selected is included, a master selector arranged to cause the operation of said selecting means under control of line signals, and means for returning such selectors to normal upon conclusion of transmission of the signal, and means operated by said restoring means for completing the partial circuits through said recording device.

10. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording device, of magnet-operated step-by-step selecting means for determining the group to which a particular recording device to be selected belongs, selecting means for determining the two partial-circuit paths in which the recording device to be selected is included and a master selector arranged to cause the operation of said selecting means under control of line signals.

11. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, of magnet-operated step-by-step selecting means for determining the group to which a particular recording device to be selected belongs, magnet operated step-by-step selecting means for determining the two partial-circuit paths in which the recording device to be selected is included, and a master selector arranged to cause the operation of said selecting means under control of line signals.

12. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, of magnet-operated step-by-step selecting means for determining the group to which a particular recording device to be selected belongs, selecting means for determining the two partial-circuit paths in which the recording device to be selected is included, circuit closing means operated by spaces between digits of line signals but not operated by shorter spaces, and a step-by-step magnet-operated master selector controlled by said space-operated circuit closing means and arranged to cause the operation of the before mentioned selecting means.

13. In a recording system, the combination with a line circuit and a plurality of groups of signal-transmitting devices therein arranged to transmit numerical signals, the signals of the transmitters of each such group having one digit in common which differs from the common digit of each of the other such groups, of a plurality of groups of recording devices, each group of recording devices corresponding to a corresponding group of transmitters, a plurality of partial-circuit paths for the recording devices of each such group, each recording device requiring the closure of two corresponding partial-circuit paths for its selection and energization, each such partial-circuit path containing a plurality of such recording devices, selecting means arranged to be operated by the common digit of the signals of any such group of transmitting devices, for determining the group of recording devices to which a particular recording device to be selected belongs, selecting means arranged to be operated by other digits of such transmitter signals, for determining the two partial-circuit paths in which the recording device to be selected is included, and a master selector arranged to be operated by the spaces between digits to cause the operation of said selecting means.

14. In a recording system, the combination with a line circuit and a plurality of groups of signal-transmitting devices therein arranged to transmit numerical signals, the signals of the transmitters of each group having one digit in common which differs from the common digit of each of the other groups, of a plurality of groups of recording devices, each group of recording devices corresponding to a corresponding group of transmitters, a plurality of partial-circuit paths for the recording device of each group, each recording device requiring the closure of two corresponding partial-circuit paths for its selection and energization, each such partial-circuit path containing a plurality of such recording devices, selecting means arranged to be operated by the common digit of the signals of any such group of transmitting devices, for determining the group of recording devices to which a particular recording device to be selected belongs, selecting means arranged to be operated by other digits of such transmitter signals, for determining the two partial-circuit paths in which the recording device to be selected is included, a master selector arranged to be operated by the spaces between digits to cause the operation of said selecting means, and restoring means operated by said master selector upon occurrence of a long space following the last digit of the signal.

15. In a recording system, the combination with a line circuit and a plurality of groups of signal-transmitting devices therein arranged to transmit numerical signals, the signals of the transmitters of each group having one digit in common which differs from the common digit of each of the other groups, of a plurality of groups of recording devices, each group of recording devices corresponding to a corresponding group of transmitters, a plurality of partial-circuit paths for the recording device of each group, each recording device requiring the closure of two corresponding partial-circuit paths for its selection and energization, each such partial-circuit path containing a plurality of such recording devices, selecting means arranged to be operated by the common digit of the signals of any such group of transmitting devices, for determining the group of recording devices to which a particular recording device to be selected belongs, selecting means arranged to be operated by other digits of such transmitter signals, for determining the two partial-circuit paths in which the recording device to be selected is included, a master selector arranged to be operated by the spaces between digits to cause the operation of said selecting means, restoring means operated by said master selector upon occurrence of a long space following the last digit of the signal, and circuit closing means operated by said master selector at the time of the operation of said restoring means, for completing the circuit through the selected recording device.

16. A space-controlled contact controlling device comprising an automatically-returned movable contact controlling member having trippable retaining means for holding it in various positions to which it may be set, a movable operating member for said contact-controlling member, and means for moving said operating member at relatively high speed during first operation, and for moving it at relatively lower speed during succeeding operations, said retaining means arranged to release said contact-controlling member upon engagement of the operating member therewith after the first setting of the contact-controlling member.

17. A space-controlled contact controlling device comprising an automatically-returned movable contact-controlling member having trippable retaining means for holding it to the various positions to which it may be set, a movable operating member for said contact-controlled member, two gear trains for moving said operating member, and means for throwing the higher speed gear train into operation during the first operation of said operating member, and for throwing the high speed gear train out of operation and throwing the lower speed gear train into operation during succeeding operations of said operating member, said retaining means arranged to release said contact-controlling member upon engagement of the operating member therewith after first setting of said contact-making member.

18. A space-controlled contact controlling device comprising an automatically-returned swinging contact-controlling member having trippable retaining means for holding it in various angular positions to which it may be set, a swinging operating member adapted to engage the trippable retaining means thereof during motion in one direction and thereby to move said contact-controlling member in one direction to an adjusted position, and means for moving said operating member at relatively high speed during first operation, and for moving it at relatively lower speed during succeeding operations, said retaining means arranged to release said contact-controlling member upon engagement of the operating member therewith after the first setting of the contact-controlling member.

19. A space-controlled contact controlling device comprising an automatically-returned swinging contact-controlling member having trippable retaining means for holding it in various angular positions to which it may be set, a swinging operating member adapted to engage the trippable retaining means thereof during motion in one direction and thereby to move said contact-controlling member in one direction to an adjusted position, two gear trains for moving said operating member, and means for throwing the higher speed gear train into operation during the first operation of said operating member, and for throwing the high speed gear train out of operation during succeeding operations of said operating member, said retaining means arranged to release said contact controlling member upon engagement of the operating member therewith after first setting of said contact-making member.

20. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, of selecting means for determining the group to which a particular recording device to be selected belongs, selecting means for determining the two partial-circuit paths in which the recording device to be selected is included, a master selector arranged to cause the operation of said selecting means under control of line signals, and circuit-closing means operated by said master selector for finally completing the circuit through the selected recording device.

21. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, of selecting means for determining the group to which a particular recording device to be selected belongs, selecting means for determining the two partial-circuit paths in which the recording device to be selected is included, a master selector arranged to cause the operation of said selecting means under control of line signals, restoring means operated by said master selector after selection as aforesaid of a particular recording device, and circuit-closing means operated by said master selector at the time of operation of said restoring means, for finally completing the circuit through the selected recording device.

22. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, of selecting means for determining the group to which a particular recording device to be selected belongs, selecting means for determining the two partial-circuit paths in which the recording device to be selected is included, a master selector arranged to cause the operation of said selecting means under control of line signals, a restoring circuit operated by said master selector after selection of a particular recording device as aforesaid, said selecting means comprising restoring magnets included in said restoring circuit, and a quick acting relay likewise included in said restoring circuit and arranged to operate before the operation of said restoring magnets, said relay arranged to complete the circuit through the recording device selected as aforesaid.

23. In a recording system, the combination with a plurality of recording devices and a plurality of outgoing and return circuits therefor, each outgoing circuit including a plurality of recording devices and each return circuit including a plurality of recording devices, said outgoing and return circuits so arranged that selection of a particular recording device may be made by selecting the particular outgoing circuit and the particular return circuit in which that recording device only is jointly included, selectors for so selecting said outgoing and return circuits, a master selector arranged to be operated by multiple-digit signals, and arranged to control such other selectors sequentially under control of successive signal digits and circuit-closing means operated by said master selector for finally completing the circuit through the selected recording device.

24. In a recording system, the combination with a plurality of recording devices and a plurality of outgoing and return circuits therefor, each outgoing circuit including a plurality of recording devices and each return circuit including a plurality of recording devices, said outgoing and return circuits so arranged that selection of a particular recording device may be made by selecting the particular outgoing circuit and the particular return circuit in which that recording device only is jointly included, selectors for so selecting said outgoing and return circuits, a master selector arranged to be operated by multiple-digit signals, and arranged to control such other selectors sequentially under control of successive signal digits, restoring means operated by said master selector after selection as aforesaid of a particular recording device, and circuit-closing means operated by said master selector at the time of operation of said restoring means, for finally completing the circuit through the selected recording device.

25. In a recording system, the combination with a plurality of recording devices and a plurality of outgoing and return circuits therefor, each outgoing circuit including a plurality of recording devices and each return circuit including a plurality of recording devices, said outgoing and return circuits so arranged that selection of a particular recording device may be made by selecting the particular outgoing circuit and the particular return circuit in which that recording device only is jointly included, selectors for so selecting said outgoing and return circuits, a master selector arranged to be operated by multiple-digit signals, and arranged to control such other selectors sequentially under control of successive signal digits, a restoring circuit operated by said master selector after selection of a particular recording device as aforesaid, said selecting means comprising restoring magnets included in said restoring circuit, and a quick acting relay likewise included in said restoring circuit and arranged to operate before the operation of said restoring magnets, said relay arranged to complete the circuit through the recording device selected as aforesaid.

26. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, and two relays for each group of recording devices, one such relay controlling one circuit path for such group, the other controlling the other circuit path for such group, of selecting means arranged to selectively actuate the said relays of the said groups, and thereby to determine the group to which a particular recording device to be selected belongs, selecting means for determining the two partial-circuit paths in which the recording device to be selected is included, and a master selector arranged to cause the operation of said selecting means under control of line signals.

27. In a recording system, the combination with a plurality of groups of recording devices, and a plurality of partial-circuit paths therefor, each recording device requiring the closure of two corresponding partial-circuit paths for its selection and energization, each such partial-circuit path containing a plurality of such recording devices, and two relays for each group of recording devices, one such relay controlling one circuit path for such group, the other controlling the other circuit path for such group, of selecting means arranged to selectively actuate the said relays of the said groups, and thereby to determine the group to which a particular recording device to be selected belongs, selecting means for determining the two partial circuit paths in which the recording device to be selected is included, a master selector arranged to cause the operation of said selecting means under control of line signals, and means adapted to be operated by spaces between digits of line signals, but not to be operated by shorter spaces, for operating said master selector.

28. A contact controlling device comprising a movable arm, a ratchet wheel thereon, a plunger carried by and movable with respect to said arm, a pawl carried by said plunger and adapted to engage and move said ratchet wheel during movement of the plunger in one direction, and means for operating said plunger.

29. A contact controlling device comprising a movable arm, a ratchet wheel thereon, a plunger carried by and movable with respect to said arm, a pawl carried by said plunger and adapted to engage and move said ratchet wheel during movement of the plunger in one direction, means for operating said plunger, trippable retaining means for said arm and means operated by said plunger for alternately locking and tripping said arm.

30. A contact controlling device comprising a movable arm, a ratchet wheel thereon, a plunger carried by and movable with respect to said arm, a pawl carried by said plunger and adapted to engage and move said ratchet wheel during movement of the plunger in one direction, means for operating said plunger, and contacts operated by said arm.

31. A contact controlling device comprising a movable arm, a ratchet wheel thereon, a plunger carried by and movable with respect to said arm, a pawl carried by said plunger and adapted to engage and move said ratchet wheel during movement of the plunger in one direction, means for operating said plunger, trippable retaining means for said arm, means operated by said plunger for alternately locking and tripping said arm, and contacts operated by said arm.

32. A space-controlled contact controlling device comprising an automatically-returned movable contact controlling member, having trippable retaining means for holding it in various positions to which it may be set, a movable operating member for said contact-controlling member, means comprising a controlling magnet for moving said operating member at relatively high speed during first operation, and for moving it at relatively lower speed during succeeding operations, said retaining means arranged to release said contact-controlling member upon engagement of the operating member therewith, after the first setting of the contact controlling member, and contact means operated during the first return movement of said operating member after the first setting of said contact-controlling member, to cause operation of the said magnet.

33. A space-controlled contact controlling device comprising an automatically-returned movable arm, having trippable retaining means for holding it in various positions to which it may be set, a ratchet wheel on said arm, a plunger carried by and movable with respect to said arm, a pawl carried by said plunger and adapted to engage and move said ratchet wheel during movement of the plunger in one direction, a movable operating member adapted to engage said plunger and thereby both to move said plunger and to set said movable arm, means comprising a controlling magnet for moving said operating member at relatively high speed during first operation, and for moving it at relatively lower speed during succeeding operations, said retaining means arranged to release said contact-controlling member upon engagement of the operating member therewith after the first setting of the contact-controlling member, and contact mechanism operated by said ratchet wheel and arranged to cause operation of said magnet upon return of said plunger following the first return of said operating member.

34. A space-controlled contact controlling device comprising an automatically-returned movable arm, having trippable retaining means for holding it in various positions to which it may be set, a ratchet wheel on said arm, a plunger carried by and movable with respect to said arm, a pawl carried by said plunger and adapted to engage and move said ratchet wheel during movement of the plunger in one direction, a movable operating member adapted to engage said plunger and thereby both to move said plunger and to set said movable arm, means comprising a controlling magnet for moving said operating member at relatively high speed during first operation, and for moving it at relatively lower speed during succeeding operations, said retaining means arranged to release said contact-controlling member upon engagement of the operating member therewith after the first setting of the contact-controlling member, and contact mechanism operated by said ratchet wheel and arranged to energize said magnet upon return of said plunger following the first return of said operating member and to deenergize said magnet following tripping of said movable arm.

35. A space-controlled contact controlling device comprising an automatically-returned movable arm having trippable retaining means for holding it in various positions to which it may be set, a ratchet wheel on said arm, a plunger carried by and movable with respect to said arm, a pawl carried by said plunger and adapted to engage and move said ratchet wheel during movement of the plunger in one direction, a movable operating member adapted to engage said plunger and thereby both to move said plunger and to set said movable arm, means comprising a controlling magnet for moving said operating member at relatively high speed during first operation, and for moving it at relatively lower speed during succeeding operations, said retaining means arranged to release said contact-controlling member upon engagement of the operating member therewith after the first setting of the contact-controlling member, and contact mechanism operated by said ratchet wheel and arranged to cause the operation of said magnet to change from high speed to low speed, following the first return of said operating member, and to change from low speed to high speed following tripping of said movable arm.

36. A space-controlled contact controlling device comprising an automatically-returned movable arm, having trippable retaining means for holding it in various positions to which it may be set, a ratchet wheel on said arm, a plunger carried by and movable with respect to said arm, a pawl carried by said plunger and adapted to engage and move said ratchet wheel during movement of the plunger in one direction, a movable operating member adapted to engage said plunger and thereby both to move said plunger and to set said movable arm, means comprising a controlling magnet for moving said operating member at relatively high speed during first operation, and for moving it at relatively lower speed during succeeding operations, said retaining means arranged to release said contact-controlling member upon engagement of the operating member therewith after the first setting of the contact-controlling member, and contact mechanism arranged to arrest movement of said operating member when the same has reached a position corresponding to that reached by said operating member during the first setting of said movable arm.

37. A contact controlling device comprising a movable arm, ratchet wheels on opposite sides thereof, a plunger carried by and movable with said arm, pawls carried by said plunger and each adapted to engage and move one of said ratchet wheels, the one pawl upon movement of the plunger in one direction, the other upon the movement of the plunger in the opposite direction, contacts operated by such movement of said ratchet wheels, and means for operating said plunger.

In testimony whereof I have signed this specification in the presence of two subscribing witnesses.

RICHARD M. HOPKINS.

Witnesses:
C. C. JOHNSON,
A. F. McLEAN.